US011440226B2

(12) United States Patent
Sasaki et al.

(10) Patent No.: US 11,440,226 B2
(45) Date of Patent: Sep. 13, 2022

(54) COMPRESSION VULCANIZATION MOLDING MOLD FOR ROLLING BEARING SEAL, AND METHOD FOR MANUFACTURING ROLLING BEARING SEAL

(71) Applicants: NTN CORPORATION, Osaka (JP); NAKANISHI METAL WORKS CO., LTD., Osaka (JP)

(72) Inventors: Katsuaki Sasaki, Iwata (JP); Takahiro Wakuda, Iwata (JP); Takashi Kaneike, Osaka (JP)

(73) Assignees: NTN CORPORATION, Osaka (JP); NAKANISHI METAL WORKS CO., LTD., Osaka (JP)

( * ) Notice: Subject to any disclaimer, the term of this patent is extended or adjusted under 35 U.S.C. 154(b) by 383 days.

(21) Appl. No.: 16/479,140

(22) PCT Filed: Oct. 17, 2017

(86) PCT No.: PCT/JP2017/037490
§ 371 (c)(1),
(2) Date: Jul. 18, 2019

(87) PCT Pub. No.: WO2018/138981
PCT Pub. Date: Aug. 2, 2018

(65) Prior Publication Data

US 2019/0351590 A1 Nov. 21, 2019

(30) Foreign Application Priority Data

Jan. 26, 2017 (JP) ............................ JP2017-012017

(51) Int. Cl.
*B29C 43/18* (2006.01)
*F16C 33/78* (2006.01)
(Continued)

(52) U.S. Cl.
CPC .............. *B29C 43/18* (2013.01); *B29C 33/12* (2013.01); *B29C 33/42* (2013.01); *B29C 43/36* (2013.01);
(Continued)

(58) Field of Classification Search
CPC ........ B29C 45/38; B29C 43/38; F16C 33/726
See application file for complete search history.

(56) References Cited

U.S. PATENT DOCUMENTS 3,501,155 A * 3/1970 Dega .................... F16J 15/3244 277/309
3,572,732 A * 3/1971 Sekulich ............. F16J 15/3244 277/553
(Continued)

FOREIGN PATENT DOCUMENTS

FR 2636691 A * 3/1990 .......... F16C 33/7823
JP 4419641 B1 * 8/1969
(Continued)

OTHER PUBLICATIONS

International Search Report for International Patent Application No. PCT/JP2017/037490 dated Dec. 26, 2017 (4 pages, 1 page translation, 5 pages total).

*Primary Examiner* — Benjamin A Schiffman
(74) *Attorney, Agent, or Firm* — Kratz, Quintos & Hanson, LLP

(57) ABSTRACT

The rolling bearing seal includes a core metal and rubber adhered to the core metal by vulcanization. The rubber includes: a seal lip portion having, over the entire circumference in the circumferential direction, a plurality of projections that extend inward in the radial direction from the inner diameter side of the core metal, and slides on a seal sliding surface of an inner ring of a rolling bearing; and an attachment portion that is attached to an outer ring of the rolling bearing. A compression vulcanization molding mold
(Continued)

includes a female mold and a male mold. The female mold has a guide portion for positioning the core metal and a rugged shape forming the projections on the seal lip portion. The male mold has an inner-diameter-side burr groove and an outer-diameter-side burr groove and the shape of a radially outermost portion of the inner-diameter-side burr groove is formed in a circle.

4 Claims, 8 Drawing Sheets

(51) Int. Cl.

| | |
|---|---|
| ***B29C 43/36*** | (2006.01) |
| ***F16J 15/3204*** | (2016.01) |
| ***B29C 33/12*** | (2006.01) |
| ***B29C 33/42*** | (2006.01) |
| ***B29C 45/38*** | (2006.01) |
| ***B29C 43/38*** | (2006.01) |
| *B29K 105/24* | (2006.01) |
| *B29K 705/00* | (2006.01) |
| *B29L 31/26* | (2006.01) |
| *F16C 19/06* | (2006.01) |

(52) U.S. Cl.
CPC .............. *B29C 43/38* (2013.01); *B29C 45/38* (2013.01); *F16C 33/7833* (2013.01); *F16J 15/3204* (2013.01); *B29C 2043/3602* (2013.01); *B29K 2105/246* (2013.01); *B29K 2705/00* (2013.01); *B29L 2031/26* (2013.01); *F16C 19/06* (2013.01)

(56) References Cited

U.S. PATENT DOCUMENTS

| | | | | |
|---|---|---|---|---|
| 3,895,814 | A * | 7/1975 | Kupfert | F16J 15/3244 277/560 |
| 3,957,411 | A * | 5/1976 | Schiesser | B29C 33/0055 425/215 |
| 4,084,826 | A * | 4/1978 | Vossieck | F16J 15/3244 277/559 |
| 4,399,998 | A * | 8/1983 | Otto | F16C 33/7823 277/552 |
| 4,770,424 | A * | 9/1988 | Otto | B60B 27/00 277/423 |
| 5,921,555 | A * | 7/1999 | Johnston | F16J 15/3228 277/549 |
| 6,409,177 | B1 * | 6/2002 | Johnston | F16J 15/3244 277/560 |
| 6,579,488 | B1 * | 6/2003 | Kobayashi | B29C 43/184 264/161 |
| 7,563,050 | B2 * | 7/2009 | Strait | F16J 15/0887 277/644 |
| 8,142,080 | B2 * | 3/2012 | Muramatsu | F16J 15/3456 384/482 |
| 8,317,202 | B2 * | 11/2012 | Rode | B61F 15/22 277/572 |
| 8,955,849 | B2 * | 2/2015 | Sedlar | F16J 15/3224 277/560 |
| 9,115,762 | B2 * | 8/2015 | Sasaki | F16C 33/7833 |
| 9,150,226 | B2 * | 10/2015 | Rode | F16J 15/0887 |
| 9,447,881 | B2 * | 9/2016 | Tsuji | F16J 15/064 |
| 10,190,637 | B2 * | 1/2019 | Inamasu | F16C 33/726 |
| 10,570,962 | B2 * | 2/2020 | Sasaki | F16C 33/7823 |
| 2011/0085755 | A1 * | 4/2011 | Pruden | F16C 33/7813 384/486 |
| 2014/0133792 | A1 * | 5/2014 | Sasaki | F16C 33/7823 384/463 |
| 2018/0045247 | A1 | 2/2018 | Inamasu | |

FOREIGN PATENT DOCUMENTS

| | | | |
|---|---|---|---|
| JP | H07-195581 | A | 8/1995 |
| JP | 2013-007463 | A | 1/2013 |
| JP | 2016-166654 | A | 9/2016 |
| JP | 2016-166655 | A | 9/2016 |
| JP | 2017-087629 | A | 5/2017 |
| WO | 2016/143786 | A1 | 9/2016 |

* cited by examiner

COMPRESSION VULCANIZATION MOLDING MOLD FOR ROLLING BEARING SEAL, AND METHOD FOR MANUFACTURING ROLLING BEARING SEAL

TECHNICAL FIELD

The present invention relates to a mold used for performing compression vulcanization molding of a rolling bearing seal, and a method for manufacturing the seal.

BACKGROUND ART

As a rolling bearing used for transmissions of automobiles or the like, a rolling bearing with a seal may be used which prevents entry of a foreign matter into the bearing by the seal. In such rolling bearings with seals, the deterioration in fuel efficiency due to increase in rotation torque by frictional resistance caused by the seal sliding on a seal sliding surface of a rolling bearing should be inhibited. For inhibiting such deterioration, various measures for reducing the rotation torque have been devised (see, for example, Patent Literatures 1 to 4).

A rolling bearing with a seal in Patent Literature 4 has projections on a seal lip portion so that oil passages that allow communication between a bearing internal space and outside are formed between a seal sliding surface and the seal lip portion. Thus, along with rotation of the bearing, lubricating oil in the oil passage is drawn to enter between the seal sliding surface and the seal lip portion owing to wedge effect, whereby formation of an oil film therebetween is promoted. This results in a state in which the seal lip portion and the seal sliding surface are completely separated from each other by the oil film so as not to be in direct contact with each other (i.e., hydrodynamic lubrication).

This provides a significant effect of achieving torque reduction and speed increase of the rolling bearing with a seal.

CITATION LIST

Patent Literature

[PTL 1] Japanese patent application publication No. 2013-007463

[PTL 2] Japanese patent application publication No. 2016-166654

[PTL 3] Japanese patent application publication No. 2016-166655

[PTL 4] International patent application Publication No. 2016/143786

SUMMARY OF THE INVENTION

Problems to be Solved by the Invention

In the case of manufacturing a rolling bearing seal having a plurality of projections on a seal lip portion as shown in Patent Literature 4, a compression vulcanization molding mold A' is generally used as shown in a vertical sectional view in FIG. 7A, a major-part enlarged vertical sectional perspective view in FIG. 7B, and a perspective view in FIG. 8, for example.

A rolling bearing seal S includes an annular core metal 7 and rubber 8 adhered to the core metal 7 by vulcanization, and the mold A' for performing compression vulcanization molding of the rubber 8 includes a female mold 1 and a male mold 2' which form an annular cavity C for molding the rubber 8.

The female mold 1 has a guide portion 3 for positioning the core metal 7, and has a rugged shape 4 forming the plurality of projections on a seal lip portion 8A. The male mold 2' has an inner-diameter-side burr groove 5' and an outer-diameter-side burr groove 6 respectively at an inner-diameter-side peripheral portion C1 and an outer-diameter-side peripheral portion C2 of the cavity C.

The burr grooves 5', 6 are grooves (annular recesses) for receiving an extra unvulcanized rubber material leaked from the cavity C during vulcanization. As shown in FIG. 8, a radially outermost portion 5A' of the inner-diameter-side burr groove 5' of the male mold 2' is formed in a rugged shape (corrugated shape) corresponding to the rugged shape 4 of the female mold 1, whereby a radial-direction gap I shown in FIG. 7A and FIG. 7B is formed substantially uniformly over the entire circumference.

In the case of such a compression vulcanization molding mold A', the rugged shape (corrugated shape) of the radially outermost portion 5A' of the inner-diameter-side burr groove 5' formed on the male mold 2' needs to be formed by mechanical working by a machining center or the like, and therefore the cost of the mold increases.

In addition, in order to form the radial-direction gap I of the rugged shape (corrugated shape) substantially uniformly over the entire circumference, it is necessary to perform alignment (angle matching) of the female mold 1 and the male mold 2' accurately in the circumferential direction, leading to reduction in productivity.

In view of the above circumstances, an object to be achieved by the present invention is to: reduce the cost for manufacturing a mold for performing compression vulcanization molding of a rolling bearing seal having a plurality of projections on a seal lip portion so that oil passages that allow communication between a bearing internal space and outside are formed between a seal sliding surface and the seal lip portion; and improve productivity in manufacturing of the seal.

Solution to the Problems

To achieve the above object, a compression vulcanization molding mold for rolling bearing seal according to the present invention is a compression vulcanization molding mold for a rolling bearing seal, which is used for compression vulcanization molding of the rolling bearing seal that separates, from outside, a bearing internal space formed between an inner ring and an outer ring of a rolling bearing. The rolling bearing seal includes an annular core metal and rubber adhered to the core metal by vulcanization. The rubber includes: a seal lip portion that extends inward in a radial direction from an inner diameter side of the core metal, and slides on a seal sliding surface of the inner ring in a circumferential direction; and an attachment portion that extends outward in the radial direction from an outer diameter side of the core metal, and is attached to the outer ring. The seal lip portion has, over an entire circumference in the circumferential direction, a plurality of projections to form, between the seal sliding surface and the seal lip portion, oil passages that allow communication between the bearing internal space and the outside. The mold includes: a female mold and a male mold which form an annular cavity for molding the rubber. The female mold has a guide portion for positioning the core metal, and a rugged shape forming the projections on the seal lip portion. The male mold has an inner-diameter-side burr groove and an outer-diameter-side burr groove respectively at an inner-diameter-side peripheral portion and an outer-diameter-side peripheral portion of the cavity, and a shape of a radially outermost portion of the inner-diameter-side burr groove is formed in a circle.

In the above configuration, the shape of the radially outermost portion of the inner-diameter-side burr groove of the male mold is a circle. Therefore, as compared to the conventional mold in which the radially outermost portion of the inner-diameter-side burr groove of the male mold has a rugged shape (corrugated shape), the shape of the male mold is simplified and thus the cost for manufacturing the mold can be reduced.

In addition, the size of burr to occur is set within a tolerable range, whereby it is possible to form the plurality of projections, from the end of the seal lip portion, over the entire area that can face the seal sliding surface in the radial direction.

Moreover, as compared to the conventional mold in which the radially outermost portion of the inner-diameter-side burr groove of the male mold is formed in a rugged shape (corrugated shape), it is not necessary to perform alignment (angle matching) of the female mold and the male mold accurately in the circumferential direction in order to form the radial-direction gap of the rugged shape (corrugated shape) substantially uniformly over the entire circumference, and therefore productivity can be improved.

It is preferable that the diameter d (mm) of the circle represented by the shape of the radially outermost portion of the inner-diameter-side burr groove is set within a range of $(D-0.2) \leq d \leq D$ relative to a diameter D (mm) of a circle in contact with ends of the projections.

In the above configuration, the diameter d (mm) of the circle represented by the shape of the radially outermost portion of the inner-diameter-side burr groove is set within a range of the above inequality relative to the diameter D (mm) of the circle in contact with the ends of the plurality of projections of the seal lip portion. This enhances reliability of molding of the rubber having the plurality of projections at the end of the seal lip portion in manufacturing of the rolling bearing seal using the compression vulcanization molding mold, because 0.2 (mm) is a burr size within a tolerable range.

A rolling bearing seal manufacturing method according to the present invention is a rolling bearing seal manufacturing method for performing compression vulcanization molding of a rolling bearing seal using the above compression vulcanization molding mold for rolling bearing seal, the method including: opening the mold and placing the core metal at the guide portion of the female mold; placing an unvulcanized rubber material in the female mold; closing the mold and pressing and heating the mold to vulcanize the rubber material; and opening the mold and taking the rolling bearing seal that is a molded product, out of the mold.

This manufacturing method uses the above compression vulcanization molding mold for rolling bearing seal, and thus provides the same effects as those of the above compression vulcanization molding mold for rolling bearing seal.

Advantageous Effects of the Invention

The compression vulcanization molding mold for rolling bearing seal and the rolling bearing seal manufacturing method according to the present invention as described above mainly provide the following effects.

(1) The shape of the radially outermost portion of the inner-diameter-side burr groove of the male mold is a circle, thereby simplifying the shape of the male mold, and thus reducing the cost for manufacturing the mold.

(2) Unlike the conventional mold, it is not necessary to align the female mold and the male mold accurately in the circumferential direction, thereby improving the productivity.

DESCRIPTION OF EMBODIMENTS

Next, embodiments of the present invention will be described in detail with reference to the accompanying drawings. Here, the present invention is not limited to embodiments shown in the accompanying drawings, but includes all the embodiments that satisfy requirements described in the claims.

As used herein, the direction of the rotation axis of a rolling bearing is referred to as an "axial direction", and a "radial direction" and a "circumferential direction" are defined using the rotation axis as a reference.

<Rolling Bearing with Seal>

Figure 1:
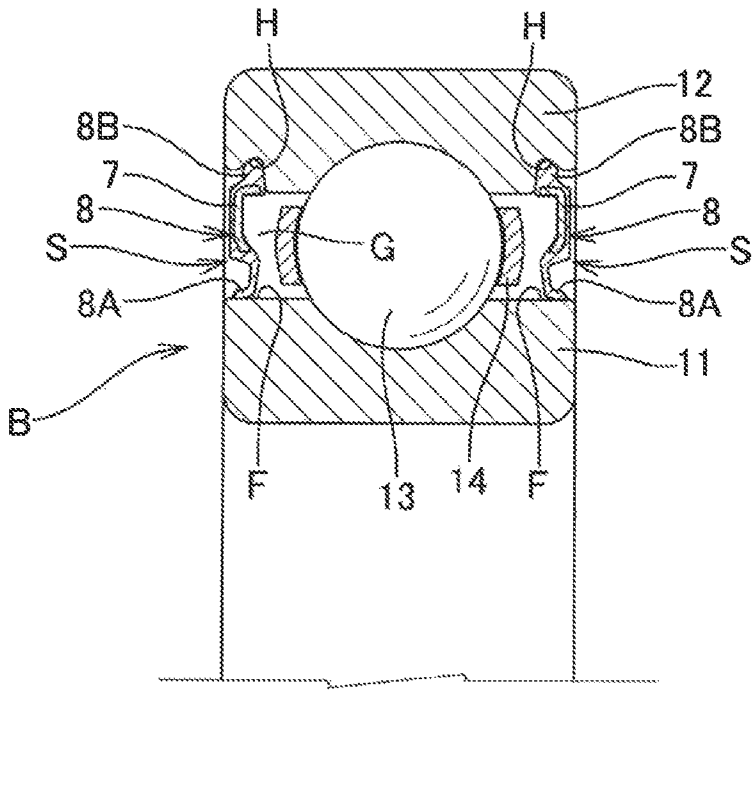
FIG. 1 is a major-part enlarged vertical sectional view showing a rolling bearing provided with a rolling bearing seal according to an embodiment of the present invention.

As shown in a major-part enlarged vertical sectional view in FIG. 1, a rolling bearing B with a seal according to an embodiment of the present invention includes: an inner ring 11; an outer ring 12; a plurality of rolling elements 13, which roll between the inner ring 11 and the outer ring 12; a retainer 14 which retains the rolling elements 13 at regular intervals in the circumferential direction; and a pair of rolling bearing seals S separated from each other in the axial direction.

The seals S provide separation between a bearing internal space G and outside, and lubricating oil is supplied to the bearing internal space G by appropriate means such as grease or oil bath.

On the external side with respect to the seals S, various foreign matters such as wear powder of a gear or the like, or minute crushed stones, exist depending on a target to which the rolling bearing B with the seal is mounted. Such powdery foreign matters can reach the vicinity of the rolling bearing B by flow of lubricating oil or air. The seals S prevent entry of the foreign matters into the bearing internal space G from outside.

Each of the seals S includes: an annular core metal 7 made of metal, such as a cold rolled steel sheet (SPCC), an electro galvanized steel sheet (SECC), or a stainless steel sheet (SUS); and rubber 8 adhered to the core metal 7 by vulcanization. The rubber 8 includes: an annular seal lip portion 8A extending inward in the radial direction from the inner-diameter side of the core metal 7 and to slide on a seal sliding surface F of the inner ring 11 in the circumferential direction; and an attachment portion 8B extending outward in the radial direction from the outer-diameter side of the core metal 8 and to be attached to a seal groove H of the outer ring 12.

Types of the rolling bearing B with the seal include an inner ring rotation type in which the inner ring 11 rotates, and an outer ring rotation type in which the outer ring 12 rotates. The rolling bearing seal S having the seal lip 8A on the inner diameter side and the attachment portion 8B on the outer diameter side is applicable to both of the inner ring rotation type and the outer ring rotation type.

Here, the rubber 8 of the seal S may be made from a material obtained by appropriately blending one kind or two or more kinds of rubbers such as nitrile rubber (NBR), hydrogenated nitrile rubber (HNBR), acrylic rubber (ACM), ethylene acrylic rubber (AEM), fluororubber (FKM, FPM), and silicone rubber (VQM), as a rubber material having high oil resistance.

Considering ease of kneading of the rubber material, vulcanization moldability, and adhesion to the core metal 7, it is also preferable to blend another kind of rubber such as liquid NBR, ethylene propylene rubber (EPDM), natural rubber (NR), isoprene rubber (IR), styrene butadiene rubber (SBR), or butadiene rubber (BR).

<Shape of Seal Lip Portion of Rolling Bearing Seal>

Figure 2A:
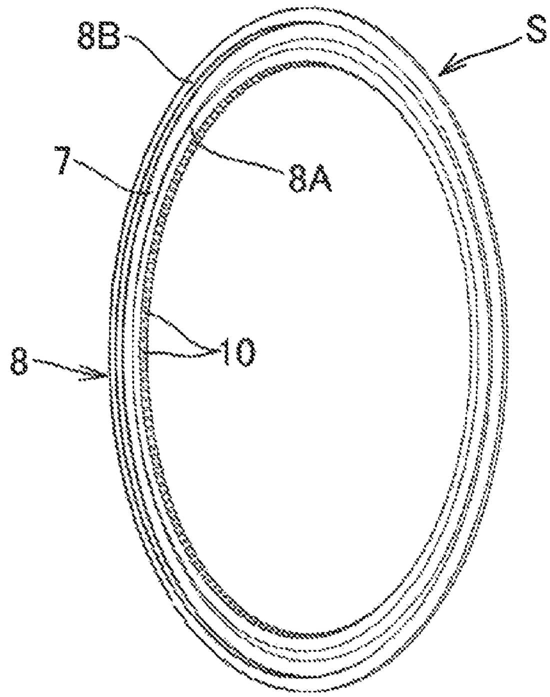
FIG. 2A is a perspective view of the rolling bearing seal.
Figure 2B:
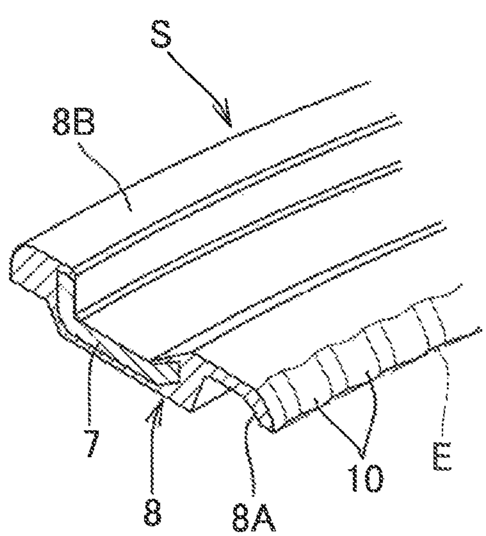
FIG. 2B is a major-part enlarged vertical sectional perspective view thereof.
Figure 3A:
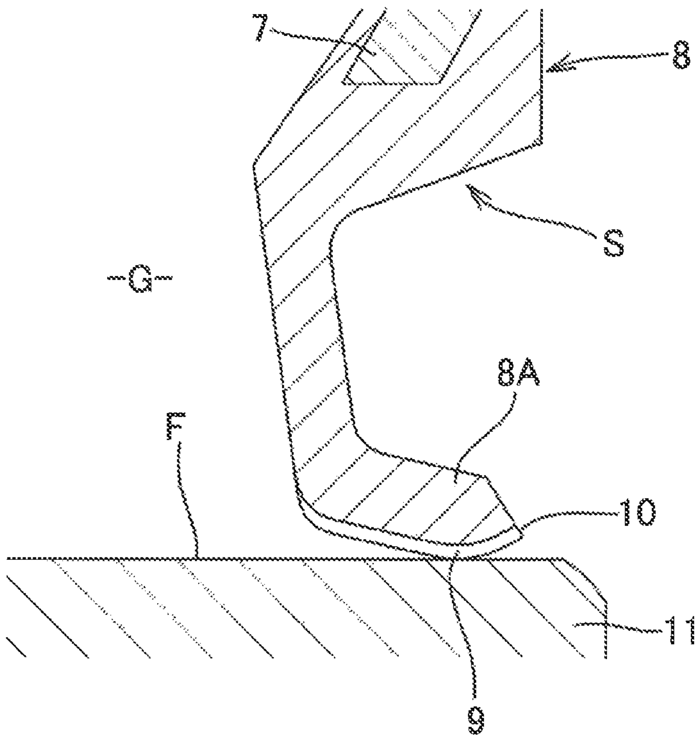
FIG. 3A is a major-part enlarged vertical sectional view of a seal lip portion and a seal sliding surface of an inner ring as seen in the radial direction.
Figure 3B:
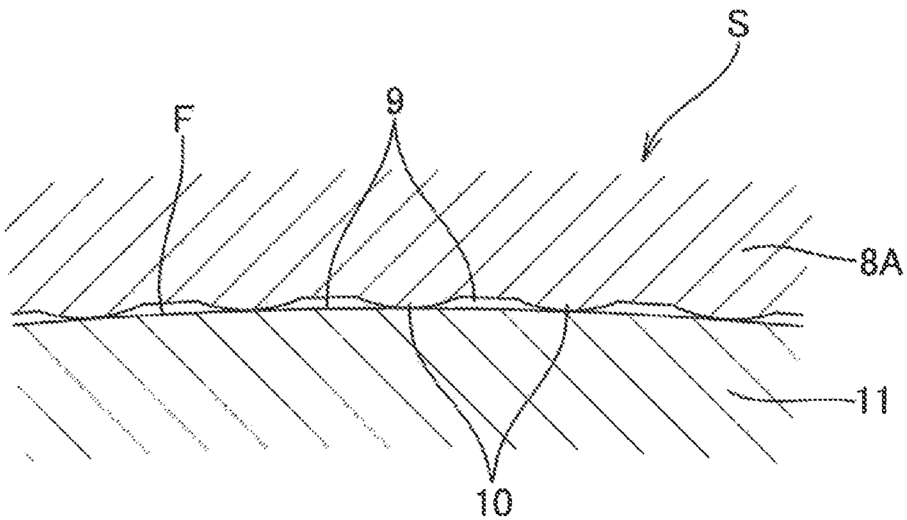
FIG. 3B is a major-part enlarged vertical sectional view thereof as seen in the axial direction.

As shown in the perspective view in FIG. 2A, the major-part enlarged vertical sectional perspective view in FIG. 2B, the major-part enlarged vertical sectional view as seen in the radial direction in FIG. 3A, and the major-part enlarged vertical sectional view as seen in the axial direction in FIG. 3B, the seal lip portion 8A of the rolling bearing seal S according to the embodiment of the present invention has a plurality of projections 10 to form, between the seal sliding surface F and the seal lip portion 8A, oil passages 9 that allow communication between the bearing internal space G and outside. The plurality of projections 10 are formed over the entire circumference in the circumferential direction of the seal lip portion 8A of the rolling bearing seal S. Further, the plurality of projections 10 are each formed, from the end of the seal lip portion 8A, over the entire area that can face the seal sliding surface F in the radial direction. Thus, along with rotation of the rolling bearing B, lubricating oil in the oil passages 9 is drawn to enter between the seal sliding surface F and the seal lip portion 8A owing to wedge effect, whereby formation of an oil film is promoted uniformly over the entire circumference of the seal sliding surface F. This results in a state in which the seal lip portion 8A and the seal sliding surface F are completely separated from each other by the oil film so as not to be in direct contact with each other (i.e., hydrodynamic lubrication).

Thus, torque reduction and speed increase of the rolling bearing B with the seal can be achieved.

The plurality of projections 10 provided in the seal lip portion 8A of the rolling bearing seal S according to the present embodiment are formed at regular intervals over the entire circumference in the circumferential direction. However, the present invention is not limited to the case where the plurality of projections 10 are formed at regular intervals over the entire circumference in the circumferential direction. That is, the plurality of projections 10 may be formed at irregular intervals.

Next, a mold A used for compression vulcanization molding of the rolling bearing seal S, and a method for manufacturing the rolling bearing seal S using the mold A, according to the embodiment of the present invention will be described.

<Compression Vulcanization Molding Mold>

Figure 4A:
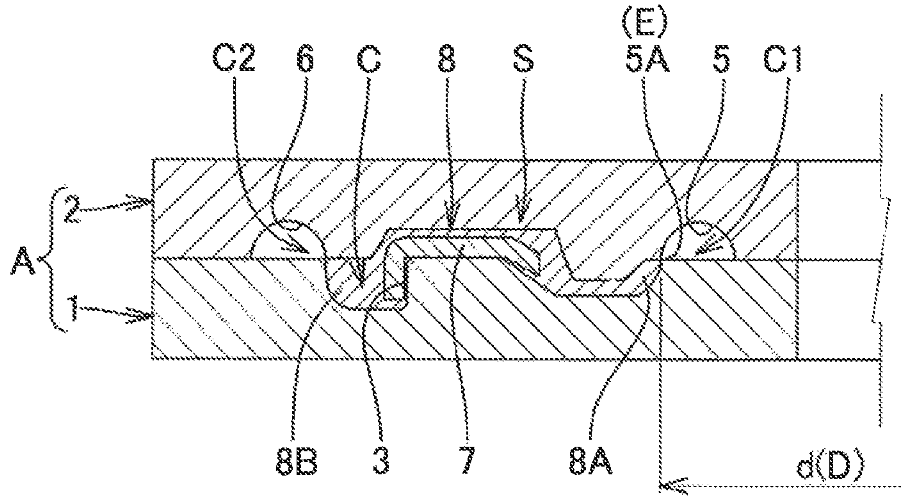
FIG. 4A is a vertical sectional view of a compression vulcanization molding mold for the rolling bearing seal according to the embodiment of the present invention.
Figure 4B:
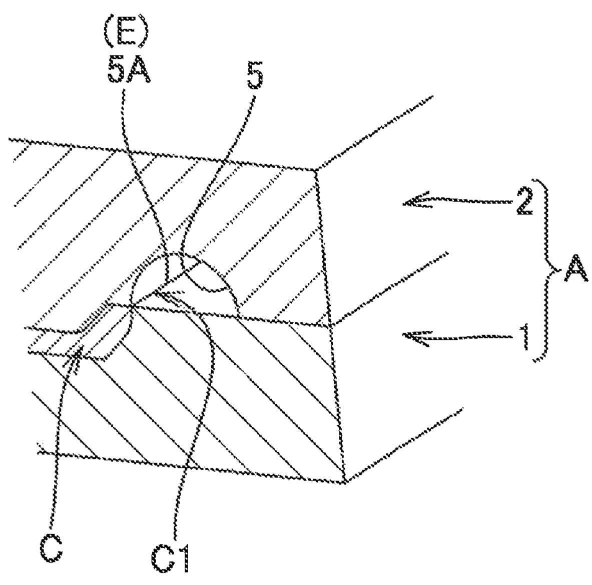
FIG. 4B is a major-part enlarged vertical sectional perspective view thereof.
Figure 5:
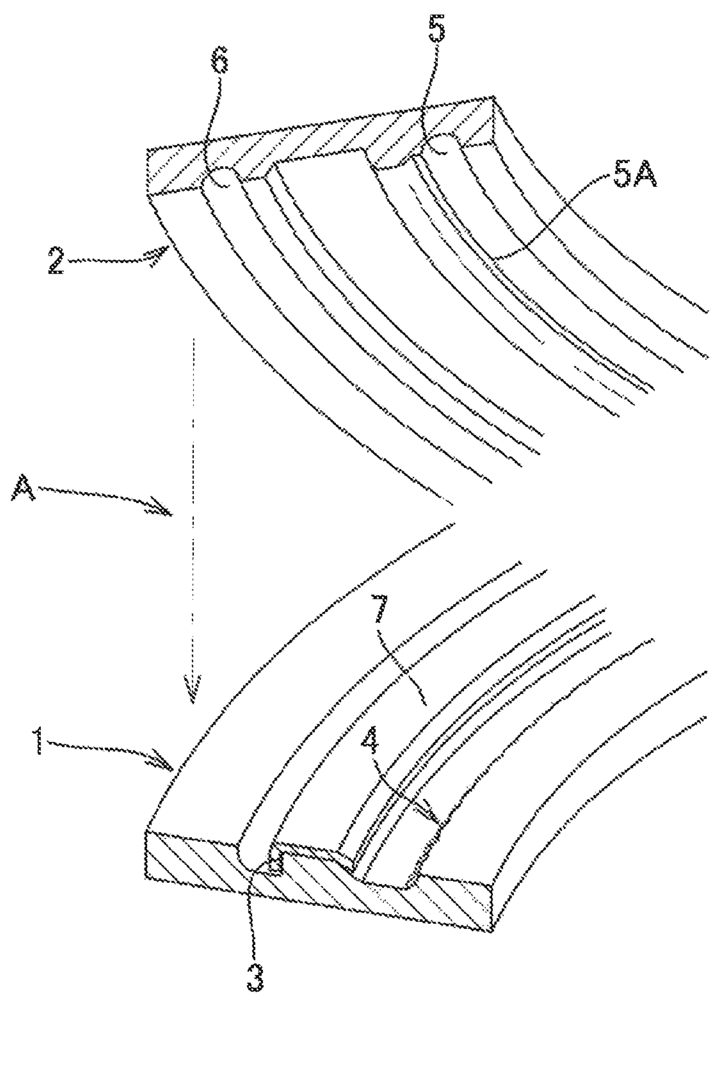
FIG. 5 is a perspective view showing a state in which the compression vulcanization molding mold is opened and a core metal is placed at a guide portion of a female mold.

As shown in a vertical sectional view in FIG. 4A, a major-part enlarged vertical sectional perspective view in FIG. 4B, and a perspective view in FIG. 5, the compression vulcanization molding mold A includes a female mold 1 and a male mold 2 which form an annular cavity C for forming the rubber 8 of the seal S.

The female mold (a lower mold or a die) 1 has a guide portion 3 for positioning the core metal 7 of the seal S, and has a rugged shape 4 forming the plurality of projections 10, 10, . . . on the seal lip portion 8A.

The male mold (an upper mold or a punch) 2 has an inner-diameter-side burr groove 5 and an outer-diameter-side burr groove 6 respectively at an inner-diameter-side peripheral portion C1 and an outer-diameter-side peripheral portion C2 of the cavity C, and the shape of a radially outermost portion 5A of the inner-diameter-side burr groove 5 is formed to be a circle.

Figure 6:
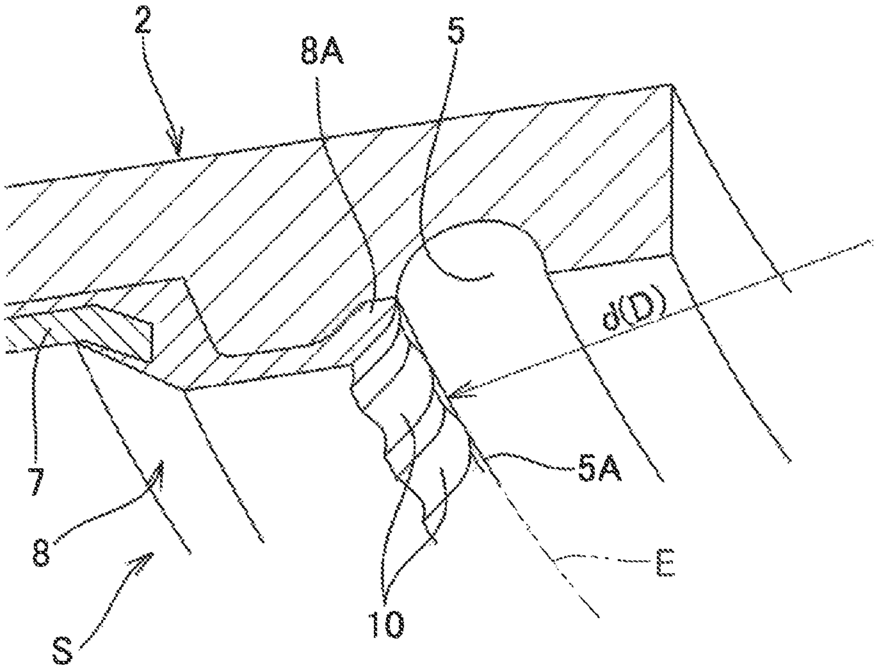
FIG. 6 is a major-part enlarged perspective view showing a state in which the rolling bearing seal is molded by the compression vulcanization molding mold, while the female mold is not shown.

As shown in a major-part enlarged perspective view in FIG. 6 in which the female mold is not shown, in the present embodiment, a diameter d of the circle represented by the shape of the radially outermost portion 5A of the inner-diameter-side burr groove 5 is set to be equal to a diameter D of a circle E (see also FIG. 2B) in contact with the ends of the plurality of projections 10 of the seal lip portion 8A.

It is noted that the diameter d (mm) of the circle represented by the shape of the radially outermost portion 5A of the inner-diameter-side burr groove 5 has only to be set within a range of $(D-0.2) \leq d \leq D$ relative to the diameter D (mm) of the circle E in contact with the ends of the plurality of projections 10. Setting the diameter d within the range of the above inequality enhances reliability of molding of the rubber 8 having the plurality of projections at the end of the seal lip portion 8A in manufacturing of the rolling bearing seal S using the compression vulcanization molding mold A, because 0.2 (mm) is a burr size within a tolerable range.

<Rolling Bearing Seal Manufacturing Method>

An example of the method for manufacturing the bearing seal S using the compression vulcanization molding mold A will be described.

(Core Metal Placing Step)

First, as shown in FIG. 5, in a state in which the mold A is opened, the core metal 7 is placed at the guide portion 3 of the female mold 1.

Before the step of placing the core metal 7 on the female mold 1, a thermosetting resin adhesive agent may be applied to an area of the core metal 7, which is to be in contact with the rubber 8, and indirect vulcanization (crosslinking) adhesion may be performed in a subsequent rubber material vulcanization step. Alternatively, direct vulcanization (crosslinking) adhesion may be performed without application of the adhesive agent, in the subsequent rubber material vulcanization step.

(Rubber Material Placing Step)

Next, for example, a rubber sheet which is an unvulcanized rubber material is placed in the female mold 1. The volume of the rubber sheet is set to be greater than the volume of the annular cavity C for forming the rubber 8.

(Rubber Material Vulcanization Step)

Next, as shown in FIG. 4A, the mold A is closed, and then pressed and heated to vulcanize the rubber sheet. An extra unvulcanized rubber material is leaked out to the burr grooves 5, 6 from split faces (parting line) of the female mold 1 and the male mold 2.

(Molded Product Taking-Out Step)

Next, the mold A is opened and the rolling bearing seal S as a molded product, shown in FIG. 2A and FIG. 4A, is taken out of the mold A.

In the state where the rolling bearing seal S that is the molded product is taken out of the mold A, the plurality of projections 10 are formed from the end of the seal lip portion 8A over the entire area that can face the seal sliding surface F in the radial direction. In addition, on the plurality of projections 10 at the end of the seal lip portion 8A, thin burr occurs between the adjacent projections 10. However, this burr protrudes outward in the axial direction of the rolling bearing B and has a burr size within a tolerable range, so that the burr does not come into contact with the seal sliding surface F as shown in FIG. 3A. Therefore, the burr does not impair the function of the rolling bearing seal S and thus does not cause a problem.

Figure 7A:
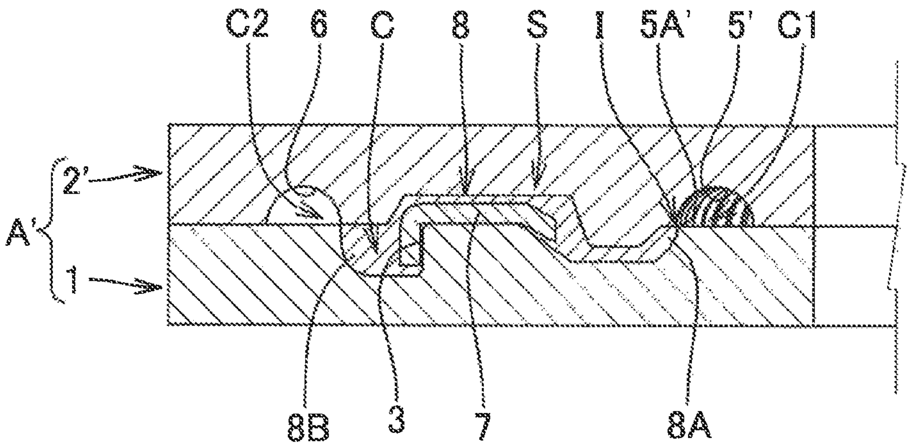
FIG. 7A is a vertical sectional view of a conventional compression vulcanization molding mold for rolling bearing seal.
Figure 7B:
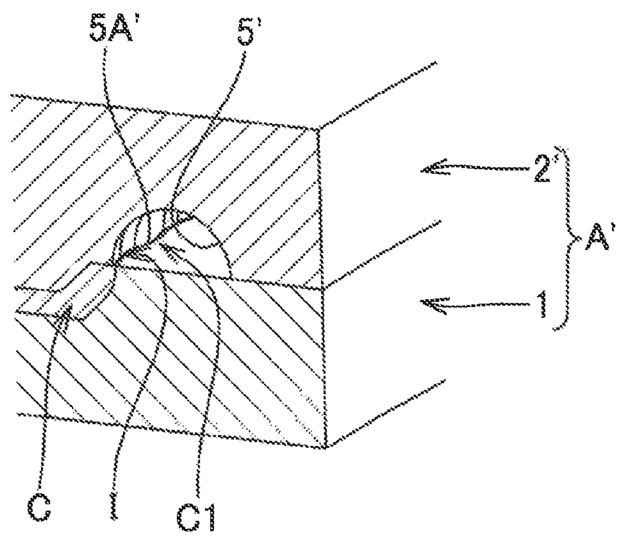
FIG. 7B is a major-part enlarged vertical sectional perspective view thereof.
Figure 8:
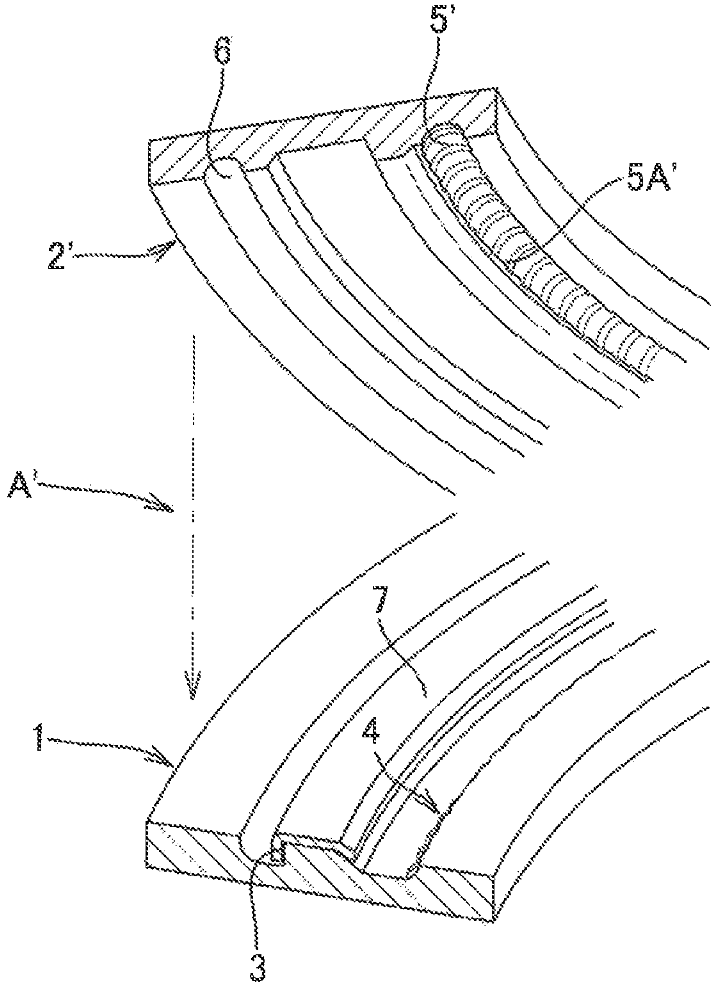
FIG. 8 is a perspective view showing a state in which the conventional compression vulcanization molding mold for rolling bearing seal is opened and a core metal is placed at a guide portion of a female mold.

In the compression vulcanization molding mold A for the rolling bearing seal and the method for manufacturing the rolling bearing seal S, configured as described above, the shape of the radially outermost portion 5A of the inner-diameter-side burr groove 5 of the male mold 2 is a circle. Therefore, as compared to the conventional mold A' (FIGS. 7A, 7B, and 8) in which the radially outermost portion 5A' of the inner-diameter-side burr groove 5' of the male mold 2' has a rugged shape (corrugated shape), the shape of the male mold 2 is simplified and thus the cost for manufacturing the mold A can be reduced.

In addition, in the compression vulcanization molding mold A and the method for manufacturing the rolling bearing seal S, configured as described above, the size of burr to occur is set within a tolerable range, whereby it is possible to form the plurality of projections 10, from the end of the seal lip portion 8A, over the entire area that can face the seal sliding surface F in the radial direction.

Moreover, as compared to the conventional mold A', it is not necessary to perform alignment (angle matching) of the female mold 1 and the male mold 2 accurately in the circumferential direction, and thus productivity can be improved.

DESCRIPTION OF THE REFERENCE CHARACTERS

1 female mold (lower mold, die)
2, 2' male mold (upper mold, punch)
3 guide portion
4 rugged shape
5, 5' inner-diameter-side burr groove
5A, 5A' radially outermost portion
6 outer-diameter-side burr groove
7 core metal
8 rubber
8A seal lip portion
8B attachment portion
9 oil passage
10 projection
11 inner ring
12 outer ring
13 rolling element
14 retainer
A, A' compression vulcanization molding mold
B rolling bearing with seal
C cavity
C1 inner-diameter-side peripheral portion
C2 outer-diameter-side peripheral portion
D diameter of circle in contact with ends of projections of seal lip portion
d diameter of circle represented by shape of radially outermost portion of inner-diameter-side burr groove
E circle in contact with ends of projections of seal lip portion
F seal sliding surface
G bearing internal space
H seal groove
I radial-direction gap
S rolling bearing seal

The invention claimed is:

1. A compression vulcanization molding mold for a rolling bearing seal, which is used for compression vulcanization molding of the rolling bearing seal that separates, from outside, a bearing internal space formed between an inner ring and an outer ring of a rolling bearing, wherein the rolling bearing seal includes an annular core metal and rubber adhered to the core metal by vulcanization, the rubber includes: a seal lip portion that extends inward in a radial direction from an inner diameter side of the core metal, and slides on a seal sliding surface of the inner ring in a circumferential direction; and an attachment portion that extends outward in the radial direction from an outer diameter side of the core metal, and is attached to the outer ling, and the seal lip portion has, over an entire circumference in the circumferential direction, a plurality of projections to form, between the seal sliding surface and the seal lip portion, oil passages that allow communication between the bearing internal space and the outside, an end of the seal lip portion curves to project toward the seal sliding surface, an edge of the end of the seal lip portion, which includes at least a portion of one of the projections, contacts the seal sliding surface, and each of the projections being formed over the entire circumference in a circumferential direction of the seal lip portion of the rolling bearing seal, the mold comprising:

a female mold and a male mold which form an annular cavity for molding the rubber, wherein the female mold has a guide portion for positioning the core metal, and a rugged shape forming the projections on the seal lip portion, and the male mold has an inner-diameter-side burr groove and an outer-diameter-side burr groove respectively at an inner-diameter-side peripheral portion and an outer-diameter-side peripheral portion of the cavity, and a shape of a radially outermost portion of the inner-diameter-side burr groove is formed in a circle.

2. The compression vulcanization molding mold for rolling bearing seal, according to claim 1, wherein a diameter d (mm) of the circle represented by the shape of the radially outermost portion of the inner-diameter-side burr groove is set within a range of $(D-0.2) \leq d \leq D$ relative to a diameter D (mm) of a circle in contact with an end of each of the projections.

3. A rolling bearing seal manufacturing method for performing compression vulcanization molding of a rolling bearing seal using the compression vulcanization molding mold for rolling bearing seal according to claim 1, the method comprising:

opening the mold and placing the core metal at the guide portion of the female mold;

placing an unvulcanized rubber material in the female mold;

closing the mold and pressing and heating the mold to vulcanize the rubber material; and opening the mold and taking the rolling bearing seal that is a molded product, out of the mold.

4. A rolling bearing seal manufacturing method for performing compression vulcanization molding of a rolling bearing seal using the compression vulcanization molding mold for rolling bearing seal according to claim 2, the method comprising:

opening the mold and placing the core metal at the guide portion of the female mold;

placing an unvulcanized rubber material in the female mold;

closing the mold and pressing and heating the mold to vulcanize the rubber material; and opening the mold and taking the rolling bearing seal that is a molded product, out of the mold.

* * * * *